No. 656,409. Patented Aug. 21, 1900.
F. A. LARAWAY & J. W. HOUSER.
CARBURETER.
(Application filed July 31, 1899.)
(No Model.)
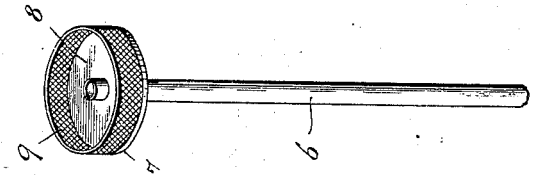
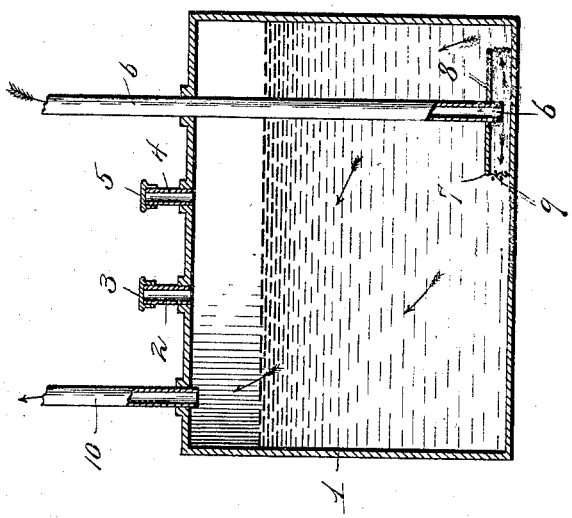
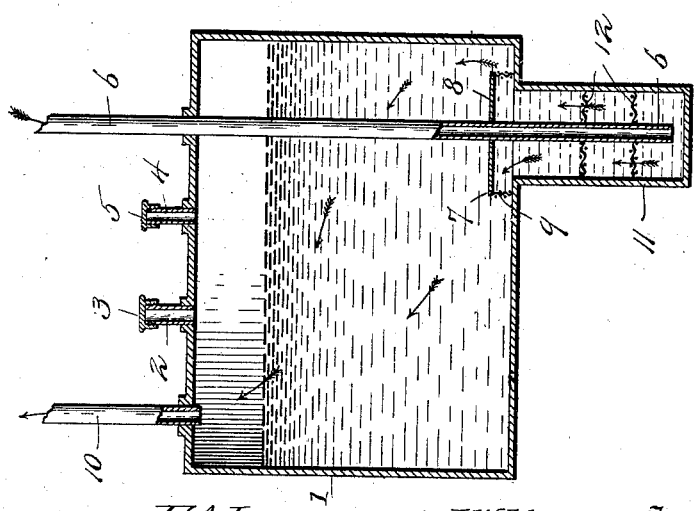
Witnesses
Harry L. Amer.
L. T. Stolhaupt, Jr.
F. A. Laraway and J. W. Houser Inventors
by C. G. Siggers
Attorney

UNITED STATES PATENT OFFICE.

FREDRICK A. LARAWAY AND JOHN W. HOUSER, OF CLEVELAND, NEW YORK.

CARBURETER.

SPECIFICATION forming part of Letters Patent No. 656,409, dated August 21, 1900.

Application filed July 31, 1899. Serial No. 725,661. (No model.)

*To all whom it may concern:*

Be it known that we, FREDRICK A. LARAWAY and JOHN W. HOUSER, citizens of the United States, residing at Cleveland, in the county of Oswego and State of New York, have invented a new and useful Gas-Generator, of which the following is a specification.

Our invention relates to gas-generators, and more especially to that type of gas-generating apparatus known in the art as "carbureters," in which atmospheric air is saturated mechanically with a volatile hydrocarbon, such as gasolene or naphtha, for the economical production of oil-gas for illuminating or heating purposes.

To this end the invention primarily contemplates an improved construction of gas-generator, having simple and efficient means for uniformly and thoroughly distributing the air under pressure in all directions through the hydrocarbon to insure a thorough carbureting thereof before passing to the gasometer or holder therefor.

The invention also has for an object the construction of the carbureting tank or vessel in a novel manner to secure a maximum depth of hydrocarbon for the air to pass through, which provision is necessary with gasolene of a low specific gravity, such as 74° and 76°.

With these and other objects in view which will readily appear to those skilled in the art as the nature of the invention is better understood the same consists in the novel construction, combination, and arrangement of parts hereinafter more fully described, illustrated, and claimed.

In the drawings, Figure 1 is a sectional view of a gas-generator embodying the improvements contemplated by the present invention. Fig. 2 is a modification thereof in which the oil well or trap is dispensed with. Fig. 3 is a detail in perspective of the air-distributing hood which adjoins the bottom of the tank or vessel and provides for the distribution of the air horizontally in all directions throughout the bottom portion of the tank or vessel.

Like reference numerals designate corresponding parts in the several figures of the drawings.

Referring to the accompanying drawings, the numeral 1 designates the closed carbureting tank or vessel, which may be of any size or shape. This carbureting tank or vessel is designed to be charged or partly filled with a highly-volatile hydrocarbon fluid—such, for example, as naphtha or gasolene—which may be readily introduced into the same through the filling-tube 2, fitted in the top of the tank or vessel and having a screw-cap or equivalent closure 3 at the outer end thereof, which serves to close the said tube after charging the tank or vessel. Associated with the feeding-tube 2 is a vent-tube 4, also fitted in the top of the tank or vessel and having at its outer end a screw-cap or equivalent closure 5, said vent-tube permitting the free egress of the air which is displaced from the tank or vessel upon the introduction of the hydrocarbon fluid therein.

The gas is generated by forcing air under pressure through the hydrocarbon fluid within the tank or vessel, causing the air to become saturated or carbureted to an extent for the production of a gas-well adapted for illuminating or heating purposes. This air is forced into the generating tank or vessel through the air-supply pipe 6, leading from a suitable air-compressing apparatus, and to provide for the proper distribution of the air throughout the hydrocarbon fluid there is associated with the air-supply pipe an air-distributing hood 7. This hood consists of an imperforate horizontal top plate 8, through which the pipe 6 extends, and a vertically-disposed foraminous wall 9 depending from the peripheral edge of the plate 8 and reaching to the main bottom of the tank or vessel. Inasmuch as the air-supply pipe 6 extends through the top plate 8 of the air-distributing hood, the air under pressure is compelled to pass into said hood, and upon rising strikes the imperforate top plate 8, which necessarily causes the lateral or horizontal deflection thereof through the foraminous wall 9 and into the oil. The said foraminous wall serves to break up the air into very fine bubbles, which rise through the fluid and become converted by the carbureting action into the illuminating or heating gas which accumulates within the top portion of the tank or vessel above the fluid, and on account of the pressure maintained in the air-supply pipe passes off through the gas-outlet pipe 10 to the gasometer or holder of any approved type.

Ordinarily in the use of the generator or carbureter, and especially for carbureting gasolene-oil of approximately 86° specific gravity and upward, there is a sufficient depth of oil for properly carbureting the air by simply having the lower end of the air-supply pipe terminating within the distributing-hood short of the main bottom of the tank or vessel, as shown in the modification of Fig. 2 of the drawings; but under some conditions, especially for carbureting gasolene of 74° and 76° specific gravity, a greater depth of oil is required. This necessitates constructing a tank or vessel with a pendent oil well or trap 11. This oil well or trap projects below the plane of the main bottom of the tank or vessel and also lies within the vertical plane of the air-distributing hood, so that the lower end of the air-supply pipe 6 may be extended within the said well or trap to within a short distance of its bottom, as shown in Fig. 1 of the drawings. In this construction a plurality of spaced screens 12 are arranged within the oil well or trap to assist in breaking up the air as it ascends into the hood 7 and is distributed by the latter through the oil in the manner already explained.

From the foregoing it is thought that the construction, operation, and many advantages of the herein-described generator or carbureter will be readily apparent to those skilled in the art without further description, and it will be understood that various changes in the size, shape, proportion, and minor details of construction may be resorted to without departing from the spirit or sacrificing any of the advantages of the invention.

Having thus described the invention, what we claim is—

A gas-generator comprising a closed carbureting tank or vessel provided at the bottom thereof with a depending oil well or trap, an air-supply pipe depending within said well or trap to a point near its bottom, a plurality of screens arranged in the well or trap above the plane of the lower end of the air-supply pipe, and an air-distributing hood covering the upper end of the oil well or trap, said hood receiving therein the pipe, and consisting of a flat horizontal imperforate top plate, and a foraminous wall extending entirely across the interval between said top plate and the main bottom of the tank or vessel, substantially as described.

In testimony that we claim the foregoing as our own we have hereto affixed our signatures in the presence of two witnesses.

FREDRICK A. LARAWAY.
JOHN W. HOUSER.

Witnesses:
WALTER A. BENNET,
LUMAN A. FERRIS.